(12) United States Patent
Yang et al.

(10) Patent No.: US 11,829,731 B2
(45) Date of Patent: Nov. 28, 2023

(54) MODULAR MULTIPLICATION CIRCUIT AND CORRESPONDING MODULAR MULTIPLICATION METHOD

(71) Applicant: INDUSTRIAL TECHNOLOGY RESEARCH INSTITUTE, Hsinchu (TW)

(72) Inventors: Chia-Hsiang Yang, Jinsha Township (TW); Liang-Hsin Lin, Yilan (TW); Yu-Ling Kang, Taoyuan (TW); Li-Chi Su, Yuanshan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/562,793

(22) Filed: Dec. 27, 2021

(65) Prior Publication Data

US 2023/0168863 A1 Jun. 1, 2023

(30) Foreign Application Priority Data

Nov. 22, 2021 (TW) ................................ 110143399

(51) Int. Cl.
*G06F 7/72* (2006.01)
(52) U.S. Cl.
CPC .............. *G06F 7/722* (2013.01); *G06F 7/728* (2013.01)
(58) Field of Classification Search
CPC . G06F 7/44; G06F 7/462; G06F 7/487; G06F 7/4876; G06F 7/4915; G06F 7/496;
(Continued)

(56) References Cited

U.S. PATENT DOCUMENTS 7,805,478 B2  9/2010  Son
8,386,546 B2  2/2013  Huang et al.
(Continued)

FOREIGN PATENT DOCUMENTS

CN  1490714 A  4/2004
CN  1550975 A  12/2004
(Continued)

OTHER PUBLICATIONS

Zhang, Yuan, et al. "An Efficient CSA Architecture for Montgomery Modular Multiplication." Microprocessors and Microsystems, Elsevier, Jan. 13, 2007, https://www.sciencedirect.com/science/article/pii/S0141933107000026. (Year: 2007).*

(Continued)

*Primary Examiner* — Jyoti Mehta
*Assistant Examiner* — Huy Duong
(74) *Attorney, Agent, or Firm* — Birch, Stewart, Kolasch & Birch, LLP (57) ABSTRACT

A modular multiplication circuit includes a main operation circuit, a look-up table, and an addition unit. The main operation circuit updates a sum value and a carry value according to $2^i A$ corresponding to a first operation value A and m bits of a second operation value B currently under operation, m is a positive integer, i is from 0 to m−1. The look-up table records values related to a modulus, and selects one of the values as a look-up table output value according to the sum value. The addition unit updates the sum value and the carry value according to the look-up table output value and outputs the updated sum value and the updated carry value to the main operation circuit. The modular multiplication circuit updates the sum value and the carry value in a recursive manner by using m different bits of the second operation value B.

14 Claims, 4 Drawing Sheets

(58) Field of Classification Search
CPC ...... G06F 7/4983; G06F 7/4986; G06F 7/722; G06F 7/724; G06F 7/727; G06F 7/728; G06F 1/03

See application file for complete search history.

(56) References Cited

U.S. PATENT DOCUMENTS

| | | | |
|---|---|---|---|
| 8,793,300 | B2 | 7/2014 | Niel |
| 10,817,262 | B2 | 10/2020 | Carr et al. |
| 2002/0194237 | A1* | 12/2002 | Takahashi ............... G06F 7/728 708/491 |
| 2004/0125948 | A1* | 7/2004 | Son ............... G06F 7/728 380/28 |
| 2004/0267855 | A1 | 12/2004 | Shantz et al. |
| 2007/0233769 | A1 | 10/2007 | Moshier et al. |
| 2010/0235414 | A1 | 9/2010 | Huang et al. |
| 2011/0225220 | A1 | 9/2011 | Huang et al. |
| 2013/0246495 | A1 | 9/2013 | Svore et al. |
| 2020/0004506 | A1* | 1/2020 | Langhammer .......... G06F 7/724 |
| 2020/0150930 | A1* | 5/2020 | Carr ............... G06F 7/727 |

FOREIGN PATENT DOCUMENTS

| | | |
|---|---|---|
| CN | 101304312 A | 11/2008 |
| CN | 103914277 A | 7/2014 |
| EP | 1 457 875 A2 | 9/2004 |
| EP | 1 471 420 A2 | 10/2004 |
| KR | 10-0481586 B1 | 4/2005 |
| KR | 10-0484487 B1 | 4/2005 |
| KR | 10-2007-0062901 A | 6/2007 |
| KR | 10-2008-0050226 A | 6/2008 |
| KR | 10-2009-0070061 A | 7/2009 |
| TW | I406548 B1 | 8/2013 |
| WO | WO 98/50851 A1 | 11/1998 |

OTHER PUBLICATIONS

Clive Maxfield, The Design Warrior's Guide to FPGAs : Devices, tools, and Flows, Elsevier Science & Technology, 2004. ProQuest Ebook Central, https://ebookcentral.proquest.com/lib/uspto-ebooks/detail.action?docID=226686 (Year: 2004).*

Taiwanese Office Action and Search Report for corresponding Taiwanese Application No. 110143399, dated Nov. 8, 2022.

Javeed et al., "Radix-4 and Radix-8 Booth Encoded Interleaved Modular Multipliers over General $F_p$", Industrial Technology Research Institute, Downloaded on Dec. 23, 2021, IEEE, total of 6 pages.

Mehrabi et al., "Low-Cost, Low-Power FPGA Implementation of ED25519 and CURVE25519 Point Multiplication", Information 2019, 10, 285, www.mdpi.com/journal/information, pp. 1-16.

Montgomery, "Modular Multiplication Without Trial Division", American Mathematical Society, Mathematics of Computation, vol. 44, No. 170 (Apr. 1985), pp. 519-521.

Nassar et al., "Efficient Interleaved Modular Multiplication Based on Sign Detection", 2015 IEEE, Industrial Technology Research Institute, Downloaded on Dec. 23, 2021, total of 5 pages.

Rahimzadeh et al., "Radix-4 Implementation of Redundant Interleaved Modular Multiplication on FPGA" The 22nd Iranian Conference on Electrical Engineering (ICEE 2014), May 20-22, 2014, Shahid Beheshti University, pp. 523-526.

* cited by examiner

MODULAR MULTIPLICATION CIRCUIT AND CORRESPONDING MODULAR MULTIPLICATION METHOD

This application claims the benefit of Taiwan application Serial No. 110143399, filed Nov. 22, 2021, the disclosure of which is incorporated by reference herein in its entirety.

TECHNICAL FIELD

The disclosure relates in general to a modular multiplication circuit and a corresponding modular multiplication method.

BACKGROUND

Along with the advance in IoT (Internet of Things), it has become a trend to configure a security chip on a terminal device having a limited capacity of power supply to realize hardware security. Most of the password algorithms used in the security chip require a modular multiplication, yet the terminal device always has a limited capacity of power supply. To extend the duration of the terminal device having a limited capacity of power supply, the password algorithm need to be accompanied by a low power consumption hardware architecture.

Therefore, it has become a prominent task for the industries to provide a solution capable of increasing hardware operation efficiency and at the same time possessing the features of low power consumption and small areas to match the physical environment of the IoT terminal device.

SUMMARY

According to one embodiment, a modular multiplication circuit is provided. The modular multiplication circuit includes a main operation circuit, a look-up table, and an addition unit. The main operation circuit is configured to update a sum value and a carry value according to $2^iA$ corresponding to a first operation value A and m bits of a second operation value B currently under operation, wherein m is a positive integer, i is an integer from 0 to m−1. The look-up table is configured to record a number of values related to a modulus and select one of these values as a look-up table output value according to the sum value. The addition unit is configured to update the sum value and the carry value according to the look-up table output value and output the updated sum value and the updated carry value to the main operation circuit. The modular multiplication circuit performs the above operation to update the sum value and the carry value in a recursive manner by using m different bits of the second operation value B until operations corresponding to M bits of the second operation value B are completed, m<M, and M is a positive integer.

According to another embodiment, a modular multiplication method is provided. The method includes the following steps. A sum value and a carry value are updated according to $2^iA$ corresponding to a first operation value A and m bits of a second operation value B currently under operation, wherein m is a positive integer, and i is an integer from 0 to m−1. By using a look-up table, a number of values related to a modulus are recorded and one of the values is selected as a look-up table output value according to the sum value. The sum value and the carry value are updated by using an addition unit according to the look-up table output value. The above steps of the modular multiplication method are repeated to update the sum value and the carry value n a recursive manner by using m different bits of the second operation value B until operations corresponding to M bits of the second operation value B are completed, m<M, and M is a positive integer.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

To realize hardware security, the present disclosure provides a modular multiplication circuit and a corresponding modular multiplication method that can be used in the modular multiplication of digital signature systems. The present disclosure provides a solution capable of increasing hardware operation efficiency and at the same time possessing the features of low power consumption and small areas to match the physical environment of the IoT terminal device.

In the present disclosure, the complexity of the modular operation is reduced by using Montgomery algorithm (Montgomery modular multiplication/Montgomery reduction) (P. L. Montgomery, "Modular multiplication without trial division," Mathematics of Computation, vol. 44, no. 170, pp. 519-519, 1985.) and without using any memory, and the number of recursive additions in 256-bit multiplication can also be reduced. Meanwhile, as the clock frequency is increased, the modular multiplication of the present disclosure can effectively reduce power consumption.

The Montgomery algorithm is a modular multiplication algorithm with excellent hardware realizability. The Montgomery algorithm can avoid the consumption of register and memory, particularly when multiplicands and multipliers are large. For example, based on the Montgomery algorithm, the modular multiplication circuit and corresponding modular multiplication method designed according to the present disclosure embodiment are applicable to the low power consumption modular multiplication of the Ed25519 digital signature system.

The Montgomery algorithm is summarized below. Let integer N>1, and a radix R is selected, wherein R is an integer coprime with N, and R>N. Let $R^{-1}$ and N' be integers and satisfy the following conditions: $0<R^{-1}<N$ and $0<N'<R$ and $RR^{-1}-NN'=1$. When calculating $t=TR^{-1}\bmod N$, the parameter w as defined in equation 1 can be substituted into equation 2 to obtain the value of t:

$$w = (T \bmod R) N' \bmod R \qquad \text{(Equation 1)}$$

$$t = \frac{T + wN}{R} \qquad \text{(Equation 2)}$$

T represents a value used in the Montgomery operation ($TR^{-1}\bmod N$); t represents a result obtained by performing the Montgomery operation on value T; w represents an intermediate value required for the calculation of t. When the value t is greater than or equivalent to N, (t-N) is used as a result of the modular operation of $TR^{-1}\bmod N$. When the value t is less than N, t is used as a result of the modular operation of $TR^{-1}\bmod N$.

By substituting equation 1 into equation 2, the following equation can be obtained:

$$t = TR^{-1}\bmod N = \frac{T+wN}{R} = \frac{T+N((T \bmod R)N' \bmod R)}{R} \qquad \text{(Equation 3)}$$

Through derivation, the following equation 4 can be obtained:

$$t = TR^{-1}\bmod N = \frac{T+wN}{R} = \frac{T+(TN' \bmod R)N}{R} \qquad \text{(Equation 4)}$$

The reasons why equation 3 and equation 4 can be equated are described below. Firstly, the modular data has the following properties: $(a \times b) \bmod c = (a \bmod c) \times (b \bmod c) \bmod c$, wherein a, b, c are integers. Secondly, $0 \le N' \le R$ hence $(T \times N') \bmod R = (T \bmod R) \times (N' \bmod R) \bmod R = (T \bmod R) \times N' \bmod R$ Thirdly, $RR^{-1}-NN'=1$, after mod R operation is performed on both sides of the equation, $RR^{-1}$ mod $R-NN'$ mod $R=1$ mod R is obtained, hence $N'=-N^{-1}$ (mod R).

By substituting $N'=-N^{-1}$ (mod R) into equation 4, the following equation can be obtained:

$$TR^{-1}\bmod N = \frac{T+wN}{R} = \frac{T+(T(-N^{-1})\bmod R)N}{R} \qquad \text{(Equation 5)}$$

By substituting $$T = k, R = 2^m, R^{-1} = \frac{1}{2^m}, N = P$$

into equation 5, the following equation can be obtained:

$$\frac{k}{2^m} \bmod P = \frac{k + (k \times (-P^{-1}) \bmod 2^m) \times P}{2^m} \qquad \text{(Equation 6)}$$

P represents modulus; m and k are integers. $PP^{-1}$ satisfies: $PP^{-1}=1$ mod $2^m$, wherein $P^{-1}$ represents a multiplicative inverse of P with respect to the modulus $2^m$; m represents the number of bits.

By substituting $k=a \times b$ into equation 6, the following equation can be obtained:

$$\frac{a \times b}{2^m} \bmod P = \frac{a \times b + (a \times b \times (-P^{-1}) \bmod 2^m) \times P}{2^m} \qquad \text{(Equation 7)}$$

According to the properties of the Montgomery algorithm (T+wN≡0 (mod R) in equation 2), the numerator $(a \times b + (a \times b \times (P^{-1}\bmod 2^m)) \times P) \bmod 2^m = 0$ in equation 7. Therefore, the numerator of equation 7 can be divided by the denominator with no remainder.

Let the application on the security chip of the Ed25519 digital signature system be taken for example. Parameters a and b are 256-bit integers. The modular operation of the Ed25519 digital signature system is expressed as:

$$\frac{a \times b}{2^{256}}$$

mod P. The operation of $$\frac{a \times b}{2^{256}}$$

mod P can be achieved by the following equation:

$$\frac{a \times b}{2^{256}} \bmod P = \frac{a \times b + (a \times b \times (-P^{-1}) \bmod 2^{256}) \times P}{2^{256}} \qquad \text{(Equation 8)}$$

Next, the multi-limb Montgomery multiplication is described below. Let $$n = \frac{256}{m},$$

wherein $b_i$ presents (i*m)-th to the ((i+1)m−1)-th bits of b and is expressed as:

$$b_i = \sum_{i=0}^{m-1} b[i]2^i;$$

b[i] represents the i-th bit of b; b represents a binary value and can be expressed as:

$$b = \sum_{i=0}^{n-1} b_i 2^{mi} \qquad \text{(Equation 9)}$$

Equation 8 can be rearranged as:

$$\frac{a \times b}{2^{256}} \bmod P = \sum_{i=0}^{n-1} \frac{ab_i}{2^{mn-mi}} \bmod P = \sum_{i=0}^{n-1} \frac{ab_i}{2^{m(n-i)}} \bmod P = \qquad \text{(Equation 10)}$$

$$\left(\ldots \left(\left((ab_0)\frac{1}{2^m} + ab_1\right)\frac{1}{2^m} + ab_2\right)\frac{1}{2^m} + ab_3\right)\frac{1}{2^m} + \ldots + ab_{n-1}\right)\frac{1}{2^m} \bmod P$$

The result of equation 10, that is, $\text{value}_{n-1}$, can be obtained by repeating the following recursive equation for n times:

$$\begin{cases} \text{value}_0 = \dfrac{ab_0}{2^m} \bmod P \\ \text{value}_{i+1} = \dfrac{\text{value}_i + ab_i}{2^m} \bmod P \end{cases} \quad \text{(Equation 11)}$$

By expressing $\text{value}_i$ as: $\text{value}_i = \text{sum}_i + \text{carry}_i$, equation 10 can be rearranged as the following iterative equation according to equation 11:

$$\begin{cases} \text{sum}_{new} + \text{carry}_{new} = \dfrac{\left[(\text{sum}+\text{carry}) + \sum_{i=0}^{m-1} 2^i ab[i]\right]}{2^m} \bmod P \\ b_{new} = b \gg m \end{cases} \quad \text{(Equation 12)}$$

By removing the mod P of equation 12 according to equation 7, the embodiment of the present disclosure can be obtained by the following equation:

$$\begin{cases} \text{sum}_{m+1} + \text{carry}_{m+1} = \dfrac{\text{sum}_m + \text{carry}_m + \left[(\text{sum}_m+\text{carry}_m) \times \left(-P^{-1}\right) \bmod 2^m\right] \times P}{2^m} \\ b_{m+1} = b_0 \gg m \end{cases} \quad \text{(Equation 13)}$$

$$\text{sum}_m + \text{carry}_m = \left[(\text{sum}_0 + \text{carry}_0) + \sum_{i=0}^{m-1} 2^i ab[i]\right]$$

When the above equation is implemented by circuits, the numerator $(-P^{-1}) \bmod 2^m \times P$ is related to $$(\text{sum} + \text{carry}) \sum_{i=0}^{m-1} 2^i ab[i] \bmod 2^m,$$

that is, related to the sum value outputted by the m-th carry save adder (CSA). Therefore, the value LT of $(\text{sum}_m + \text{carry}_m) \times (-P^{-1}) \bmod 2^m \times P$ in the numerator can be obtained from the look-up table according to the sum value outputted by the m-th carry save adder:

$$\begin{cases} \text{sum}_{new} + \text{carry}_{new} = \dfrac{\left[(\text{sum}+\text{carry}) + \sum_{i=0}^{m-1} 2^i ab[i]\right] + LT}{2^m} \\ b_{new} = b \gg m \end{cases} \quad \text{(Equation 14)}$$

LT represents a value obtained from the look-up table. Since the result of the modular operation mod $2^m$ can be a value between 0 to $(2^m-1)$, the LT value can be obtained by multiplying 0 to $(2^m-1)$ by P, that is, the LT value can be a value between $0 \times P$ to $(2^m-1) \times P$ ($2^m$ combinations). Furthermore, since $$\left[(\text{sum}+\text{carry}) + \sum_{i=0}^{m-1} 2^i ab[i]\right] + LT$$

can always be divided by $2^m$ with no remainder, the m rightmost bits of $0 \times P$ to $(2^m-1) \times P$ can be abandoned, then $2^m$ is added thereto (except when LT=0). During the addition of $$\left[(\text{sum}+\text{carry}) + \sum_{i=0}^{m-1} 2^i ab[i]\right]$$

and LT, the m rightmost bits of $$\left[(\text{sum}+\text{carry}) + \sum_{i=0}^{m-1} 2^i ab[i]\right]$$

can be automatically omitted (that is, the m rightmost bits of the sum value outputted by the m-th carry save adder).

Hence, the actual LT value is $$0, 2^m\left(\left\lfloor \dfrac{P}{2^m} \right\rfloor + 1\right), 2^m\left(\left\lfloor \dfrac{2P}{2^m} \right\rfloor + 1\right), 2^m\left(\left\lfloor \dfrac{3P}{2^m} \right\rfloor + 1\right), \ldots ,$$

$$2^m\left(\left\lfloor \dfrac{(2^m-1)P}{2^m} \right\rfloor + 1\right),$$

and one of the LT values is returned according to the sum value outputted by the m-th carry save adder, so that the result of the last addition is:

$$\left[(\text{sum}+\text{carry}) + \sum_{i=0}^{m-1} 2^i ab[i]\right] + \left[(\text{sum}+\text{carry}) + \sum_{i=0}^{m-1} 2^i ab[i] \times \left(-P^{-1}\right) \bmod 2^m\right] \times P,$$

that is, it can be divided by $2^m$ with no remainder.

The above process of generating LT value and the method of obtaining the corresponding LT value from the sum value inputted to the look-up table are further described below. According to the observation in actual circuit operation, after addition is performed on the carry value for m times, all of the m rightmost bits of the carry value are 0. Hence, the sum of the m rightmost bits of the sum value, the m rightmost bits of the carry value and the m rightmost bits of the LT value will equal to the sum of the m rightmost bits of the sum value and the m rightmost bits of the LT value. Therefore, the 4 rightmost bits of the carry value can be neglected. Thus, only the operation of the sum value and the LT value need to be considered in this disclosure, and there is no need to consider the carry value.

Suppose m=4, sum=( . . . . . . 0,0111)$_2$, then an LT value that makes the value of sum+LT divided by $2^m$ with no remainder needs to be found. That is, the LT makes the m rightmost bits of the value of sum+LT equivalent to 0 needs to be found. Through operation, when LT=( . . . . . . 0,1111)$_2$, sum+LT=( . . . . . . ,0000)$_2$. With the situation where all the m rightmost bits of the sum value are 0 being excluded, the addition operation of 4 rightmost bits of the value of sum+LT will produce a carry value in the fifth rightmost bit. Hence, when not all the m rightmost bits of the sum value are 0, all the m rightmost bits of the LT value as well as the m rightmost bits of the sum value can directly be set to 0, and a carry value in the fifth rightmost bit of the LT value is directly produced. For example, LT can be adjusted as LT'=( . . . . . . 1,0000)$_2$. Such an operation can obtain the same result. Thus, although the value of LT possibly could be 0×P to $(2^m-1)\times P$, the actual value of LT can be $$0, 2^m\left(\left\lfloor\frac{P}{2^m}\right\rfloor+1\right), 2^m\left(\left\lfloor\frac{2P}{2^m}\right\rfloor+1\right), 2^m\left(\left\lfloor\frac{3P}{2^m}\right\rfloor+1\right), \ldots,$$

$$2^m\left(\left\lfloor\frac{(2^m-1)P}{2^m}\right\rfloor+1\right),$$

and the object of the present disclosure still can be achieved. In the above equation, "+1" represents the carry value in the fifth rightmost bit of the LT value.

Figure 1:
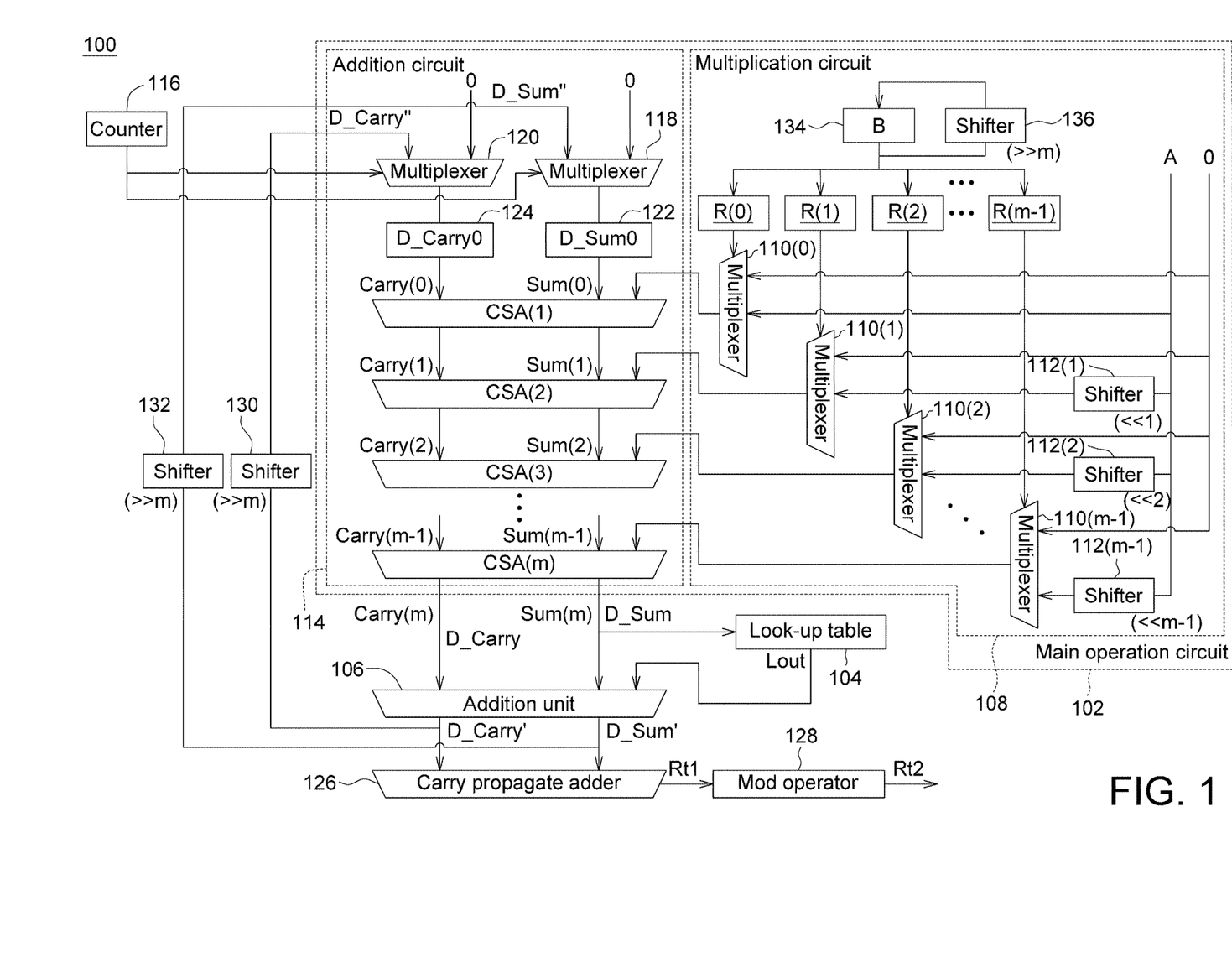
FIG. 1 is a block diagram of a modular multiplication circuit according to an embodiment of the present disclosure.

Referring to FIG. 1, a block diagram of a modular multiplication circuit according to an embodiment of the present disclosure is shown. The modular multiplication circuit 100 includes a main operation circuit 102, a look-up table 104, and an addition unit 106. The main operation circuit 102 is configured to update a sum value D_Sum and a carry value D_Carry according to 2$^i$A corresponding to a first operation value A and m bits of a second operation value B currently under operation, wherein m is a positive integer, i is an integer from 0 to m−1. The first operation value A and the second operation value B are the input of the modular multiplication circuit 100 and are positive integers with n bits (n is less than or equal to 256).

The look-up table 104 is configured to record a number of values related to a modulus P and select one of the values as a look-up table output value Lout according to the sum value D_Sum. The addition unit 106 is configured to update the sum value D_Sum and the carry value D_Carry according to the look-up table output value Lout and output the updated sum value and the updated carry value to the main operation circuit 102. In the modular multiplication of the Ed25519 digital signature system, the value of the modulus P is equivalent to $2^{255}-19$.

The modular multiplication circuit 100 performs the above operation in a recursive manner by updating the sum value D_Sum and the carry value D_Carry using m different bits of the second operation value B until the operations corresponding to M bits of the second operation value B are completed, wherein m<M, M is a positive integer.

Detailed descriptions are exemplified below using the modular multiplication circuit 100 of FIG. 1. The main operation circuit 102 calculates a sum of products of each of m bits of the second operation value B currently under operation and its corresponding 2$^i$A to update the sum value D_Sum and the carry value D_Carry. For example, the main operation circuit 102 calculates the value of $$\sum_{i=0}^{m-1} 2^i AB[i].$$

Furthermore, the main operation circuit 102 includes a multiplication circuit 108. The multiplication circuit 108 includes a 0-th multiplexer 110(0) to an (m−1)-th multiplexer 110(m−1) and a 0-th register R(0) to an (m−1)-th register R(m−1). The 0-th register R(0) to the (m−1)-th register R(m−1) respectively store one of the m bits of the second operation value B currently under operation. Suppose the second operation value B is a 256-bit value and is temporarily stored in the register 134 and can be expressed as (B[255], B[254], . . . B[m], B[m−1], . . . B[2], B[1], B[0])$_2$, then the 0-th register R(0) to the (m−1)-th register R(m−1) respectively store bit B[0] to bit B[m−1] of the second operation value B currently under operation. The selection ends of the 0-th multiplexer 110(0) to the (m−1)-th multiplexer 110(m−1) are respectively controlled by the output values of the 0-th register R(0) to the (m−1)-th register R(m−1), such as bit B[0] to bit B[m−1]. The first input ends of the 0-th multiplexer 110(0) to the (m−1)-th multiplexer 110(m−1) receive a digital value 0. The second input ends of the 0-th multiplexer 110(0) to the (m−1)-th multiplexer 110(m−1) respectively receive $2^0$A to $2^{m-1}$A. The sum value D_Sum and the carry value D_Carry are determined by the output values of the 0-th multiplexer 110(0) to the (m−1)-th multiplexer 110(m−1).

The descriptions are exemplified below using the 0-th register R(0). When the value of the bit B[0] stored in the 0-th register R(0) is 0, the 0-th multiplexer 110(0) uses the digital value 0 of the first input end as an output, that is, the 0-th multiplexer 110(0) outputs a digital value 0. The output of the 0-th multiplexer 110(0) is equivalent to B[0]*$2^0$*A=0*$2^0$*A=0. When the value of the bit B[0] stored in the 0-th register R(0) is 1, the 0-th multiplexer 110(0) uses the $2^0$*A of the second input end as an output, that is, the 0-th multiplexer 110(0) outputs $2^0$*A. The output of the 0-th multiplexer 110(0) is equivalent to B[0]*$2^0$*A=1*$2^0$*A=$2^0$*A. That is, whether $2^0$*A is used as an output of the multiplexer 110(0) is determined according to the value of bit B[0] stored in the 0-th register R(0).

The descriptions are exemplified below using the (m−1)-th register R(m−1). When the value of the bit B[m−1] stored in the (m−1)-th register R(m−1) is 0, the (m−1)-th multiplexer 110(m−1) uses the digital value 0 of the first input end as an output, that is, the (m−1)-th multiplexer 110(m−1) outputs a digital value 0. The output of the (m−1)-th multiplexer 110(m−1) is equivalent to B[m−1]*$2^{m-1}$*A=0*$2^{m-1}$*A=0. When the value of the bit B[m−1] stored in the (m−1)-th register R(m−1) is 1, the (m−1)-th multiplexer 110(m−1) uses the $2^{m-1}$*A of the second input end as an output, that is, the (m−1)-th multiplexer 110(m−1) outputs $2^{m-1}$*A. The output of the (m−1)-th multiplexer 110(m−1) is equivalent to B[m−1]*$2^{m-1}$*A=1*$2^{m-1}$*A=$2^{m-1}$*A. That is, whether $2^{m-1}$*A is used as an output of the (m−1)-th multiplexer 110(m−1) is determined according to the value of bit B[m−1] stored in the (m−1)-th register R(m−1).

After the operations corresponding to m bits of the second operation value B (that is, bit B[0] to B[m−1]) are completed, the 0-th register R(0) to the (m−1)-th register R(m−1) respectively store another m bits of the second operation value B for the subsequent operation to repeat the above actions. The others m bits of the second operation value B are, for example, the m rightmost bits after the second operation value B is shifted rightward by m bits, such as bit B[m] to bit B[2m−1], for the subsequent operation. The others m bits of the second operation value B are written to the 0-th register R(0) to the (m−1)-th register R(m−1) for performing the next recursive operation. The above method of shifting the second operation value B rightward by m bits can be implemented by a right-shift operator, such as the shifter 136, which shifts the second operation value B rightward by m bits (represented by ">>m").

The $2^0$A to $2^{m-1}$A can be realized by shifting the first operation value A leftward by 0 to m−1 bits respectively. The left shift can be realized by (m−1) left-shift operators, such as shifter 112(1) to shifter 112(m−1). For example, the first operation value A is inputted to the shifter 112(1), which performs a 1-bit left shift (represented by "<<1"), then the shifter 112(1) outputs the value of $2^1$A which equals to $2^1$ multiplied by A. The first operation value A is inputted to the shifter 112(2), which performs a 2-bit left shift (represented by "<<2"), then the shifter 112(2) outputs the value of $2^2$A which equals to $2^2$ multiplied by A. The first operation value A is inputted to the shifter $112(m-1)$, which performs an $(m-1)$-bit left shift (represented by "<<m−1"), then the shifter $112(m-1)$ outputs the value of $2^{m-1}$A which equals to $2^{m-1}$ multiplied by A.

By using a number of multiplexers and a number of shifters, the multiplication circuit 108 can calculate the products of each of the m bits of the second operation value B currently under operation and its corresponding $2^i$A without using complicated circuits, that is, the multiplication circuit 108 can calculate the value $2^i$AB[i] in the equation $$\sum_{i=0}^{m-1} 2^i AB[i],$$

which is very efficient, not only saving circuit area and further reducing power consumption.

The main operation circuit 102 further includes an addition circuit 114. The addition circuit 114 includes a first carry save adder (CSA) CSA(1) to an m-th carry save adder CSA(m). The first carry save adder CSA(1) receives an initial sum operation value Sum(0), an initial carry operation value Carry(0), and an output value of the 0-th multiplexer 110(0), and outputs a first sum operation value Sum(1) and a first carry operation value Carry(1). The second carry save adder CSA(2) receives the first sum operation value Sum(1), the first carry operation value Carry(1), and an output value of the 1-th multiplexer 110(1), and outputs a second sum operation value Sum(2) and a second carry operation value Carry(2). By the same analogy, the m-th carry save adder CSA(m) receives an (m−1)-th sum operation value Sum(m−1), an (m−1)-th carry operation value Carry(m−1), and an output value of the (m−1)-th multiplexer $110(m-1)$, and outputs an m-th sum operation value Sum(m) and an m-th carry operation value Carry(m). The m-th sum operation value Sum(m) and the m-th carry operation value Carry(m) are used as the sum value D_Sum and the carry value D_Carry outputted by the main operation circuit 102. Thus, a recursive operation is completed.

The addition unit 106 is configured to add the look-up table output value Lout outputted by the look-up table 104 with the sum value D_Sum and the carry value D_Carry outputted by the main operation circuit 102, the result value after addition is represented by the updated sum value D_Sum' and the updated carry value D_Carry'. The updated sum value D_Sum' and the updated carry value D_Carry' are outputted to the main operation circuit 102. The addition unit 106 can be implemented, for example, by a carry save adder. After the operations corresponding to the m bits of the second operation value B are completed, the updated sum value D_Sum' and the updated carry value D_Carry' outputted by the addition unit 106 are shifted rightward by m bits (for example, shifted rightward by 2 bits through 2 right-shift operators, such as shifters 130 and 132), then are inputted to the main operation circuit 102. For example, the sum value D_Sum" and the carry value D_Carry" obtained by shifting the updated sum value D_Sum' and the updated carry value D_Carry' rightward by m bits are inputted to the main operation circuit 102. For example, under the control of the count value outputted by the counter 116, the multiplexer 118 selects a digital value 0 or the sum value D_Sum" then outputs the selected value to the register 122 as an initial sum value D_Sum0. Under the control of the count value outputted by the counter 116, the multiplexer 120 selects a digital value 0 or the carry value D_Carry" then outputs the selected value to the register 124 as an initial carry value D_Carry0. The registers 122 and 124 can be implemented by a D-type flip-flop, for example. When the count value outputted by the counter 116 is 0, the multiplexer 118 and the multiplexer 120 select the digital value 0 as outputs. When the count value outputted by the counter 116 is not 0, the multiplexer 118 and the multiplexer120 respectively select the sum value D_Sum" and the carry value D_Carry" as outputs. The initial sum value D_Sum0 and the initial carry value D_Carry0 respectively are used as the initial sum operation value Sum(0) and the initial carry operation value Carry(0) inputted to the first carry save adder CSA(1) for repeating the above steps. Thus, the next recursive operation is started.

The modular multiplication circuit 100 may further include a carry propagate adder (CPA) 126 and a mod operator 128. The carry propagate adder 126 is configured to, after the operations corresponding to M bits of the second operation value B are completed, add the updated sum value D_Sum' and the updated carry value D_Carry' to obtain a first result value Rt1. That is, the sum value D_Sum' and the carry value D_Carry' obtained from the recursive operation are added to obtain a temporary first result value Rt1. The mod operator 128 is configured to perform a modular operation on the first result value Rt1 to obtain a second result value Rt2 as an output of the modular multiplication circuit 100. The mod operator 128 performs a modular operation on the first result value Rt1 within a fixed time to obtain a second result value Rt2, that is, Rt2=Rt1 mod P. The second result value Rt2 is the final output of the modular multiplication circuit 100 of the present embodiment, that is, the second result value Rt2=AB/$2^{256}$ mod P. When the first result value Rt1 is greater than P (for example, when there is a carry value), the use of the mod operator 128 assures that the obtained second result value Rt2 is less than P. When the first result value Rt1 is not greater than P, the first result value Rt1 can also be used as an output of the modular multiplication circuit 100 of the present embodiment, that is, the first result value Rt1 can also be used as the value of AB/$2^{256}$ mod P.

That is, after one time of recursive operation, that is, the multiplication circuit 108 (including the 0-th multiplexer 110(0) to the (m−1)-th multiplexer $110(m-1)$ and the 0-th register R(0) to the (m−1)-th register R(m−1)), the addition circuit 114 (including the first carry save adder CSA(1) to the m-th carry save adder CSA(m)), the look-up table 104, and the addition unit 106 complete the above operations corresponding to m bits of the second operation value B, the modular operation circuit 100 performs the next recursive operation on another m bits of the second operation value B. After repeating the above recursive operation for a number of times until the operations corresponding to all bits of the second operation value B are completed, the modular operation circuit 100 inputs the sum value D_Sum' and the carry value D_Carry' to the carry propagate adder 126. The carry propagate adder 126 then adds the sum value D_Sum' and the carry value D_Carry' obtained when the operations corresponding to all bits of the second operation value B are completed to obtain the first result value Rt1.

Besides, the look-up table 104 records $2^m$ values related to the modulus P, for example. The $2^m$ values respectively can be divided by $2^m$ with no remainder. The hardware architecture of the look-up table 104 can be implemented by a combinational logic circuit without using any memory unit, so that the hardware area and access time of the memory unit can be reduced. The addition unit 106 adds the sum value D_Sum and the carry value D_Carry outputted by the main operation circuit 102 with the look-up table output value Lout, and outputs the updated sum value D_Sum' and the updated carry value D_Carry'.

That is, in order to realize the update of equation 14, m carry save adders (i.e. the first carry save adder CSA(1) to the m-th carry save adder CSA(m)) are needed to add the current sum value (D_Sum) and the current carry value (D_Carry) with $2^i A$ according to the bit value stored in the register R(i) respectively (such as B[i]), wherein i=0 to (m−1). Meanwhile, in order to assure that the numerator of equation 14 can be divided by the denominator with no remainder, a value related to the modulus P (corresponding to LT) should be obtained from the look-up table 104, and the addition unit 106 (that is, another carry save adder, such as the (m+1)-th carry save adder) adds the obtained value related to the modulus P (corresponding to LT) to the numerator.

The look-up table 104 records $2^m$ values related to the modulus P. The $2^m$ values related to the modulus P include:

$$0, 2^m\left(\left\lfloor \frac{P}{2^m} \right\rfloor + 1\right), 2^m\left(\left\lfloor \frac{2P}{2^m} \right\rfloor + 1\right), 2^m\left(\left\lfloor \frac{3P}{2^m} \right\rfloor + 1\right), \ldots ,$$

$$2^m\left(\left\lfloor \frac{(2^m-1)P}{2^m} \right\rfloor + 1\right),$$

wherein $\lfloor\ \rfloor$ represents a floor function. The look-up table 104 includes a combinational logic circuit (not shown). For example, the combinational logic circuit may include AND gates, OR gates, NOT gates, and so on. At least one end of the combinational logic circuit is electrically coupled to a high voltage or a low voltage to record the above values related to the modulus P (for example, high voltage represents digital value 1, and low voltage represents digital value 0). The combinational logic circuit obtains one of the values related to the modulus P corresponding to the sum value D_Sum inputted to the look-up table.

The carry save adder is an adder architecture which can reduce the required operation time for addition by increasing the number of registers. When performing a series of additions, the adder architecture can reduce critical paths, increase clock frequency, and have lower hardware complexity than ordinary adders. The critical path is a path through which the signal needs to pass for completing one time of processing, such as the path through which the signal needs to pass for completing one time of recursive operation for the sum value. Suppose the input is three values: sum, carry, and Z, then the carry save adder outputs the sum ($sum_{new}$) and the carry ($carry_{new}$) of these values which satisfies $sum_{new} + carry_{new} = sum + carry + Z$. For example, when sum=(00 . . . 0,0111)$_2$, carry=(00 . . . 0,0000)$_2$, Z=(00 . . . 0,1111)$_2$, then $sum_{new}$=(00 . . . 0,1000)$_2$, $carry_{new}$=(00 . . . 0,1110)$_2$.

The carry propagate adder is a general adder which has more operational complexity than the carry save adder. When the input of the carry propagate adder is two values X and Y, the output is a value result and satisfies result=X+Y. For example, when X=(00 . . . 0,0111)$_2$, Y=(00 . . . 0,1111)$_2$, then result=(00 . . . 1,0110)$_2$.

Figure 2:
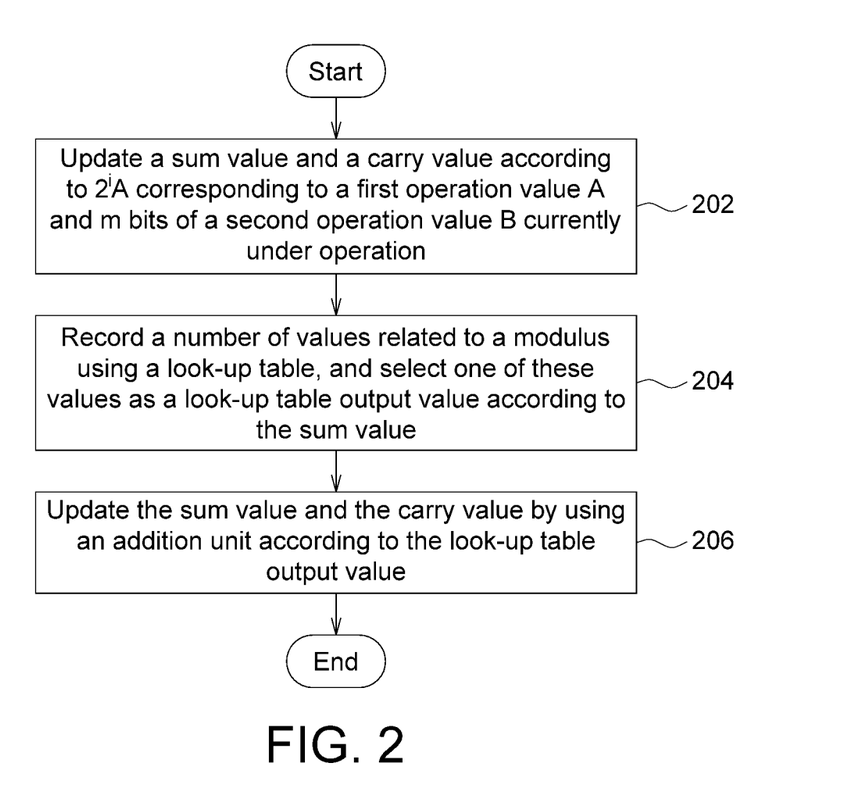
FIG. 2 is a flowchart of a modular multiplication method according to an embodiment of the present disclosure.

Referring to FIG. 2, a flowchart of a modular multiplication method according to an embodiment of the present disclosure is shown. The method includes the following steps. Firstly, the method begins at step 202, a sum value and a carry value are updated according to $2^i A$ corresponding to a first operation value A and m bits of a second operation value B currently under operation, wherein m is a positive integer, i is an integer from 0 to m−1. Then, the method proceeds to step 204, a number of values related to a modulus are recorded by using a look-up table, and one of these values is selected as a look-up table output value according to the sum value. Then, the method proceeds to step 206, the sum value and the carry value are updated by using an addition unit according to the look-up table output value. The above steps of the modular multiplication method are repeated to update the sum value and the carry value in a recursive manner by using m different bits of the second operation value B until operations corresponding to M bits of the second operation value B are completed, m<M, and M is a positive integer.

Figure 3:
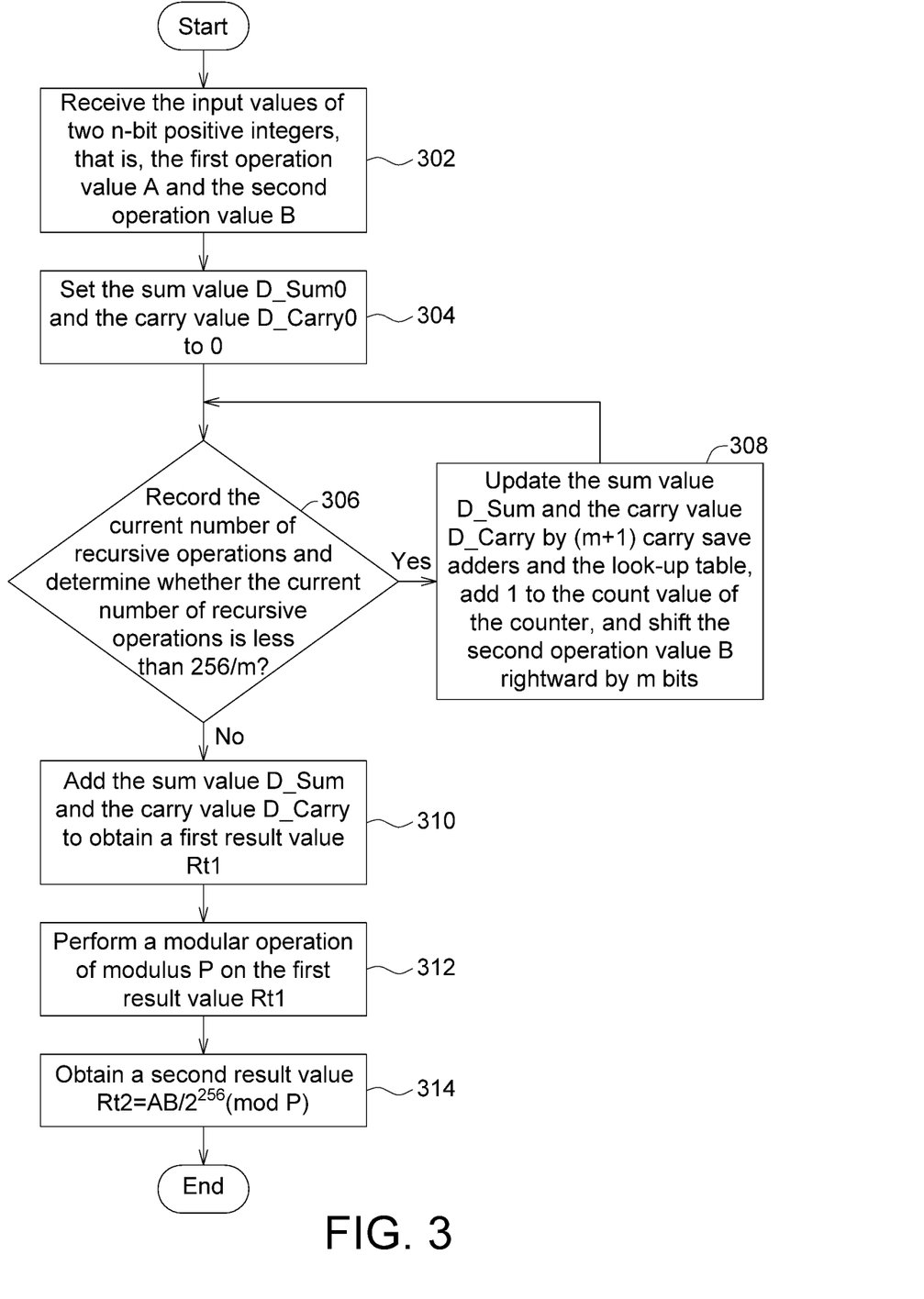
FIG. 3 is a flowchart of a modular multiplication method according to another embodiment of the present disclosure.

Referring to FIG. 3, a flowchart of a modular multiplication method according to another embodiment of the present disclosure is shown. Firstly, the method begins at step 302, the input values of two n-bit positive integers, that is, the first operation value A and the second operation value B, are received, wherein n≤256. When n is not 256, the bits by which the first operation value A and the second operation value B fall short of 256 bits are padded by 0. Then, the method proceeds to step 304, the sum value D_Sum0 and the carry value D_Carry0 are set to 0. Then, the method proceeds to step 306, the current number of recursive operations is recorded (for example, the number of the recursive operations which have been performed is recorded by the counter 116), and whether the current number of recursive operations is less than 256/m is determined. If yes, the method performs 308; otherwise, the method proceeds to step 310, wherein m is the number of bits of the second operation value B operated in each recursive operation, and 256/m is a positive integer.

In step 308, the sum value D_Sum and the carry value D_Carry are updated by (m+1) carry save adders and the look-up table according to equation 14:

$$D\_sum_{new} + D\_carry_{new} = \frac{\left[(D\_Sum + D\_Carry) + \sum_{i=0}^{m-1} 2^i AB[i]\right] + LT}{2^m}, B_{new} = B \gg m \quad \text{(Equation 15)}$$

P is modulus (P=$2^{255}$−19); ">>" represents a right shift operation; "LT" represents a value obtained from the look-up table according to the D_Sum value outputted by the m-th carry save adder. After the (m+1) carry save adders and the look-up table perform one time of operation to update the sum value D_Sum and the carry value D_Carry, the count value of the counter 116 is added by 1, and the second operation value B are shifted rightward by m bits.

Then, the method proceeds to step 310, after the recursive operation is performed for 256/m times, the sum value D_Sum and the carry value D_Carry are inputted to the carry propagate adder and an addition (that is, the sum value D_Sum and the carry value D_Carry are added) is performed to obtain a temporary value (the first result value Rt1).

Then, the method proceeds to step 312, a modular operation of modulus P is performed on the first result value Rt1. Then, the method proceeds to step 314, the final result of the modular operation of modulus P is obtained, that is, the second result value Rt2=AB/$2^{256}$ (mod P) is obtained.

Figure 4:
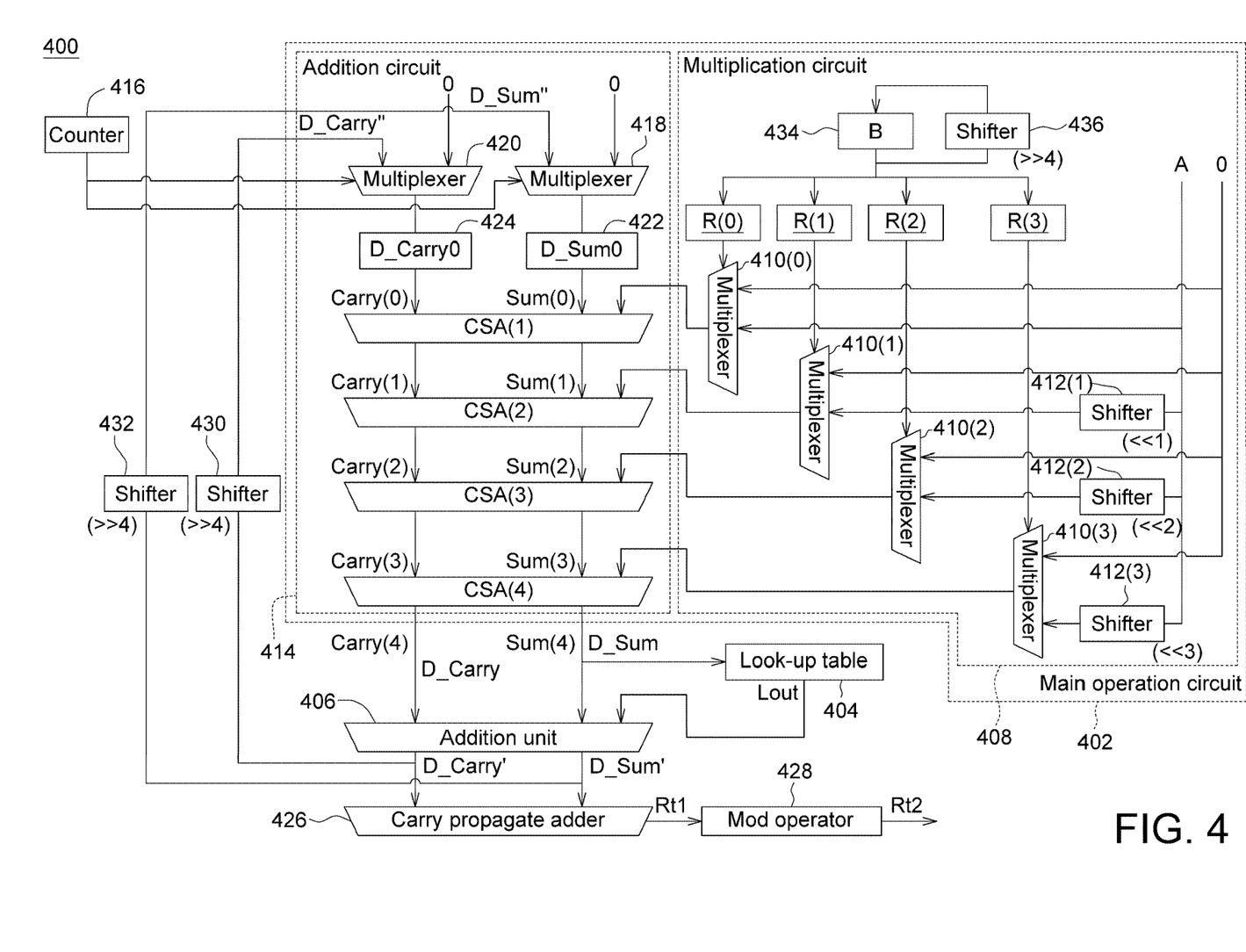
FIG. 4 is a block diagram of the modular multiplication circuit according to a first embodiment of the present disclosure when m equals to 4.

Referring to FIG. 4, a block diagram of the modular multiplication circuit according to the embodiment of the present disclosure in FIG. 1 when m=4 is shown. The parameter m represents the number of bits processed in a recursive operation. As indicated in FIG. 4, the number of recursive additions in the 256-bit multiplication is reduced to 256/m=64.

As indicated in FIG. 4, parameter $P=2^{255}-19$. The first operation value A and the second operation value B inputted to the modular multiplication circuit 400 respectively are two positive integers with n bits, wherein n is less than or equal to 256. When n is not 256, the bits by which the first operation value A and the second operation value B fall short of 256 bits are padded by 0. The output of the modular multiplication circuit 400 of FIG. 4 is a 256-bit positive integer, that is, the second result value $Rt2=AB/2^{256}$ (mod P).

The modular multiplication circuit 400 includes registers 422 and 424, which can respectively be implemented by a D-type flip-flop, for recording the current sum value and the current carry value. The multiplexers 418 and 420 are configured to set the initial sum value D_Sum0 and the initial carry value D_Carry0 stored in the registers 422 and 424 to 0, then update the sum value D_Sum and the carry value D_Carry outputted by the main operation circuit 402 according to the following equation 16:

$$\text{sum}_{new} + \text{carry}_{new} = \frac{[(\text{sum} + \text{carry}) + AB[0] + (2A)B[1] + (4A)B[2] + (8A)B[3]] + LT}{2^4}$$

$$B_{new} = B \gg 4$$

(Equation 16)

The value sum represents the current sum value (such as the initial sum value D_Sum0); the value carry represents the current carry value (such as the initial carry value D_Carry0); the value $\text{sum}_{new}$ represents the updated sum value D_Sum; the value $\text{carry}_{new}$ represents the updated carry value D_Carry. Each time when the update of the sum value D_Sum and the carry value D_Carry is completed, the second operation value B is shifted rightward by 4 bits as $B_{new}$.

The counter 416 is configured to record the current number of recursive operations. To realize the update of equation 16, 4 multiplexers 410(0) to 410(3) are used to receive 4 bits of the second operation value B temporarily stored in the register 434 to determine whether to add $2^i A$ to the current sum value (such as the initial sum value D_Sum0) and the current carry value (such as the initial carry value D_Carry0). In each recursive operation, 4 bits of the second operation value B are processed. Each time when the recursive operation is completed, the second operation value B is shifted rightward by 4 bits through the shifter 436.

The carry save adders CSA(1) to CSA(4) perform addition on the current sum value (such as the initial sum value D_Sum0) and the current carry value (such as the initial carry value D_Carry0) according to 4 bits of the second operation value B respectively stored in the register R(0) to R(3) and the values of A, 2A, 4A, and 8A, wherein the values of 2A, 4A, 8A are obtained by shifting the first operation value A leftward by 1 to 3 bits by the shifter 412 (1) to 412 (3) respectively. The addition unit 406 (another carry save adder) adds the value (LT) related to the modulus P ($P=2^{255}-19$) obtained from the look-up table 404 and the fourth sum operation value Sum(4) and the fourth carry operation value Carry(4) outputted by the carry save adder CSA(4) to obtain the updated sum value D_Carry' and the updated carry value D_Sum'.

The look-up table 404 records $2^m$ (in the present example, $2^4=16$) values related to P. The $2^m$ values related to P are $$0, 2^4\left(\left\lfloor \frac{P}{2^4}\right\rfloor + 1\right), 2^4\left(\left\lfloor \frac{2P}{2^4}\right\rfloor + 1\right), 2^4\left(\left\lfloor \frac{3P}{2^4}\right\rfloor + 1\right), \ldots,$$

$$2^4\left(\left\lfloor \frac{(2^4-1)P}{2^4}\right\rfloor + 1\right),$$

that is, $$0, 16\left(\left\lfloor \frac{P}{16}\right\rfloor + 1\right), 16\left(\left\lfloor \frac{2P}{16}\right\rfloor + 1\right), 16\left(\left\lfloor \frac{3P}{16}\right\rfloor + 1\right), \ldots, 16\left(\left\lfloor \frac{15P}{16}\right\rfloor + 1\right),$$

wherein $\lfloor \ \rfloor$ represents a floor function.

An item of data is obtained from the look-up table 404 as a look-up table output value Lout, that is, as the LT value of equation 16 according to the fourth sum operation value Sum(4) outputted by the fourth carry save adders CSA(4). The fourth sum operation value Sum(4) and the fourth carry operation value Carry(4) outputted by the fourth carry save adders CSA(4) are added with the look-up table output value (LT) by the addition unit 406 (which may be the fifth carry save adder).

The carry propagate adder 426 adds the sum value D_Sum' and the carry value D_Carry' obtained from 64 times of recursive operation to obtain a first result value Rt1. The mod operator 428 performs a modular operation of modulus P ($P=2^{255}-19$) on the first result value Rt1 to obtain a second result value Rt2 ($Rt2=AB/2^{256}$(mod P)).

By using the Montgomery algorithm, the present disclosure reduces the complexity of the modular operation, and by using the carry save adder, without using any memory, the number of recursive additions in the 256-bit multiplication is reduced to 64 times (in an embodiment of the present disclosure where m=4, m is the number of bits processed in each recursive operation). The present disclosure achieves complicated modular multiplication by using circuit elements such as adder, multiplexer, shifter and so on without using complicated multiplication circuit, hence saving circuit area and reducing power consumption. The present disclosure can further increase clock frequency and the processing speed of circuits.

In the present disclosure, only the values related to the modulus P (that is, the values related to the modulus P in the look-up table) need to be pre-processed, and the pre-processed data does not need to vary with the multiplicand and multiplier. Therefore, for the modular multiplication circuit with a fixed modulus P, the content of the look-up table for the pre-processed data can be implemented by the truth table on the circuit, decoder or other combinational logic circuits without using extra register or memory, hence resolving the problems of calculating pre-processed data encountered in relevant prior arts.

To summarize, the present embodiment can achieve the following effects. (a) Without using any memory unit: since the content of the look-up table is only related to parameter P, the look-up table can be implemented by the truth table on the circuit, decoder or other combinational logic circuits without using extra memory. (b) Increasing operating speed: the carry save adder can shorten the critical path and reduce the number of recursive operations, and therefore increase the clock frequency and the operating speed. (c) Lower power consumption: since no memory unit is needed and the core recursive operation can be implemented by the carry save adder, power consumption can therefore be reduced. When m=4, the present disclosure can produce better effects as described above.

The effects of the embodiment of the present disclosure are compared with prior art 1 to prior art 4 below.

Prior art 1: M. A. Mehrabi and C. Doche, "Low-Cost, Low-Power FPGA Implementation of ED25519 and CURVE25519 Point Multiplication," Information, vol. 10, no. 9, p. 285, 2019.

Prior art 2: Rahimzadeh, L.; Eshghi, M.; Timarchi, S. Radix-4 implementation of redundant interleaved modular multiplication on FPGA. Proceedings of the 2014 22nd Iranian Conference on Electrical Engineering (ICEE), Tehran, Iran, 20-22 May 2014; pp. 523-526.

Prior art 3: Javeed, K.; Wang, X. Radix-4 and radix-8 booth encoded interleaved modular multipliers over general Fp. In Proceedings of the 2014 24th International Conference on Field Programmable Logic and Applications (FPL), Munich, Germany, 2-4 Sep. 2014.

Prior art 4: Nassar, M. A.; El-Sayed, L. A. Efficient Interleaved Modular Multiplication Based on Sign Detection. In Proceedings of the 2015 IEEE/ACS 12-th International Conference of Computer Systems and Applications (AICCSA), Marrakech, Morocco, 17-20 Nov. 2015.

In prior art 1, radix-8 interleaved modular multiplication is used, but data needs to be pre-processed each time before the calculation is performed and extra memory is needed at the same time to record the pre-processed data. Prior art 2 is similar to prior art 1 except that prior 2 uses radix-4 rather than radix-8. Although the amount of pre-processed data is reduced, the number of recursive additions in 256-bit multiplication is increased. In prior art 3, since there is no need to pre-process data, the critical path is longer and the clock frequency is lower. In prior art 4, an efficient interleaved modular multiplication (EIMM) based on the sign detection algorithm is used, the complexity of the modular operation is reduced by the sign detection technique. However, the number of recursive additions in 256-bit multiplication does not decrease and remains unchanged, that is, 256, making the overall amount of operation increased.

The embodiment of present disclosure is compared with the modular multiplication architecture with low power consumption related to Ed25519 used in above prior arts 1 to 4, and the result is illustrated in Table 1. Both the embodiment of present disclosure and prior arts 1 to 4 can realize the modular multiplication in the Ed25519. Table 1 illustrates the results of computation platform, latency, clock frequency and power obtained in the first embodiment when m=4, the second embodiment when m=8, and prior arts 1 to 4. Table 1 shows that the power consumption in the first embodiment and the second embodiment of the present disclosure is much lower than the power consumption in prior arts 1 to 4, and the embodiment of the present disclosure indeed has the characteristic of low power consumption.

TABLE 1

| Computation platform | | Latency (ns) | Clock frequency (MHz) | Power (mW) |
|---|---|---|---|---|
| First embodiment | ASIC (40-nm) | 136 | 500 | 8.4 |
| Second embodiment | ASIC (40-nm) | 72 | 500 | 9.9 |

TABLE 1-continued

| Computation platform | | Latency (ns) | Clock frequency (MHz) | Power (mW) |
|---|---|---|---|---|
| Prior art 1 | ZYNQ7000 (FPGA, 28-nm PL) | 180 | 550 | 152 |
| Prior art 2 | VIRTEX5 (FPGA, 65-nm PL) | 303 | 442 | 2311 |
| Prior art 3 | VIRTEX6 (FPGA, 40-nm PL) | 1487 | 86.6 | 2319 |
| Prior art 4 | VIRTEX4 (FPGA, 90-nm PL) | 1171.66 | 437.12 | 2556 |

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A modular multiplication circuit, comprising:
a main operation circuit, configured to update a sum value and a carry value according to $2^iA$ corresponding to a first operation value A and m bits of a second operation value B currently under operation, wherein m is a positive integer, i is an integer from 0 to m−1;
a look-up table, configured to record a plurality of values related to a modulus and select one of the values as a look-up table output value according to the sum value updated by the main operation circuit; and
an addition unit, configured to update the sum value and the carry value updated by the main operation circuit according to the look-up table output value and output the updated sum value and the updated carry value to the main operation circuit;
wherein the main operation circuit calculates a sum of products of each of the m bits of the second operation value B currently under operation and corresponding $2^iA$ to update the sum value and the carry value by using a plurality of multiplexers, a plurality of shifters, and a plurality of first adders;
wherein the addition unit is implemented by a second adder;
wherein the modular multiplication circuit performs the operations of the main operation circuit, the look-up table, and the addition unit to update the sum value and the carry value again in a recursive manner by using m different bits of the second operation value B until operations corresponding to M bits of the second operation value B are completed, m<M, and M is a positive integer,
wherein the main operation circuit comprises a multiplication circuit, comprising a 0-th multiplexer to an (m−1)-th multiplexer and a 0-th register to an (m−1)-th register, wherein the 0-th register to the (m−1)-th register respectively store one of the m bits of the second operation value B currently under operation, selection ends of the 0-th multiplexer to the (m−1)-th multiplexer are respectively controlled by the output values of the 0-th register to the (m−1)-th register, first input ends of the 0-th multiplexer to the (m−1)-th multiplexer receive a digital value 0, second input ends of the 0-th multiplexer to the (m−1)-th multiplexer respectively receive $2^0A$ to $2^{m-1}A$, and the sum value and the carry value are determined by the output values of the 0-th multiplexer to the (m−1)-th multiplexer; and wherein after operations corresponding to the m bits of the second operation value B are completed, the 0-th register to the (m−1)-th register respectively store another m bits of the second operation value B for the subsequent operation to repeat the action that the 0-th register to the (m−1)-th register respectively store one of the m bits of the second operation value B currently under operation, and repeat the action that the sum value and the carry value are determined by the output values of the 0-th multiplexer to the (m−1)-th multiplexer.

2. The modular multiplication circuit according to claim 1, wherein $2^0 A$ to $2^{m-1} A$ are realized by shifting the first operation value A leftward by 0 to m−1 bits respectively.

3. The modular multiplication circuit according to claim 1, wherein the main operation circuit further comprises:
an addition circuit, comprising a first carry save adder (CSA) to an m-th carry save adder, wherein the first carry save adder receives an initial sum operation value Sum(0), an initial carry operation value Carry(0), and an output value of the 0-th multiplexer, and outputs a first sum operation value Sum(1) and a first carry operation value Carry(1), the second carry save adder receives the first sum operation value Sum(1), the first carry operation value Carry(1), and an output value of the 1-th multiplexer, and outputs a second sum operation value Sum(2) and a second carry operation value Carry(2), the m-th carry save adder receives an (m−1)-th sum operation value Sum(m−1), an (m−1)-th carry operation value Carry(m−1), and an output value of the (m−1)-th multiplexer, and outputs an m-th sum operation value Sum(m) and an m-th carry operation value Carry(m) as the sum value and the carry value updated by the main operation circuit.

4. The modular multiplication circuit according to claim 1, wherein after the operations corresponding to the m bits of the second operation value B are completed, the updated sum value and the updated carry value outputted from the addition unit are shifted rightward by m bits then inputted to the main operation circuit, and the second operation value B is shifted rightward by m bits then m bits are stored to the 0-th register to the (m−1)-th register as another m bits of the second operation value B for the subsequent operation.

5. The modular multiplication circuit according to claim 1, wherein the look-up table records $2^m$ values related to the modulus, the $2^m$ values respectively are divided by $2^m$ with no remainder, the addition unit adds the sum value and the carry value updated from the main operation circuit with the look-up table output value, and outputs the updated sum value and the updated carry value.

6. The modular multiplication circuit according to claim 1, further comprising:
a carry propagate adder (CPA), configured to add the updated sum value and the updated carry value outputted from the addition unit to obtain a first result value when the operations corresponding to the M bits of the second operation value B are completed; and
a mod operator, configured to perform a modular operation on the first result value to obtain a second result value as the output of the modular multiplication circuit.

7. The modular multiplication circuit according to claim 1, wherein the look-up table records $2^m$ values related to the modulus, the $2^m$ values related to the modulus comprises:

$$0, 2^m\left(\left\lfloor \frac{P}{2^m} \right\rfloor + 1\right), 2^m\left(\left\lfloor \frac{2P}{2^m} \right\rfloor + 1\right), 2^m\left(\left\lfloor \frac{3P}{2^m} \right\rfloor + 1\right), \ldots ,$$

$$2^m\left(\left\lfloor \frac{(2^m-1)P}{2^m} \right\rfloor + 1\right).$$

⌊ ⌋ represents a floor function.

8. A modular multiplication method, comprising:
updating a sum value and a carry value according to $2^i A$ corresponding to a first operation value A and m bits of a second operation value B currently under operation by a main operation circuit, wherein m is a positive integer, and i is an integer from 0 to m−1;
recording a plurality of values related to a modulus by using a look-up table and selecting one of the values as a look-up table output value according to the sum value updated by the main operation circuit; and
updating the sum value and the carry value updated by the main operation circuit by using an addition unit according to the look-up table output value;
wherein the main operation circuit calculates a sum of products of each of the m bits of the second operation value B currently under operation and corresponding $2^i A$ to update the sum value and the carry value by using a plurality of multiplexers, a plurality of shifters, and a plurality of first adders;
wherein the addition unit is implemented by a second adder;
wherein the steps of the main operation circuit, the look-up table, and the addition unit of the modular multiplication method are repeated to update the sum value and the carry value again in a recursive manner by using m different bits of the second operation value B until operations corresponding to M bits of the second operation value B are completed, m<M, and M is a positive integer;
wherein the step of updating the sum value and the carry value according to $2^i A$ corresponding to the first operation value A and m bits of the second operation value B currently B under operation is performed by the main operation circuit, and the main operation circuit comprises a multiplication circuit, comprising a 0-th multiplexer to an (m−1)-th multiplexer and a 0-th register to an (m−1)-th register, wherein the 0-th register to the (m−1)-th register respectively store one of the m bits of the second operation value B currently under operation, selection ends of the 0-th multiplexer to the (m−1)-th multiplexer are respectively controlled by output values of the 0-th register to the (m−1)-th register, first input ends of the 0-th multiplexer to the (m−1)-th multiplexer receive a digital value 0, second input ends of the 0-th multiplexer to the (m−1)-th multiplexer respectively receive $2^0 A$ to $2^{m-1} A$, and the sum value and the carry value are determined by output values of the 0-th multiplexer to the (m−1)-th multiplexer; and
wherein after the operations corresponding to m bits of the second operation value B are completed, the 0-th register to the (m−1)-th register respectively store another m bits of the second operation value B for the subsequent operation to repeat the action that the 0-th register to the (m−1)-th register respectively store one of the m bits of the second operation value B currently under operation, and repeat the action that the sum value and the carry value are determined by the output values of the 0-th multiplexer to the (m−1)-th multiplexer.

9. The modular multiplication method according to claim 8, wherein $2^0A$ to $2^{m-1}A$ are realized by shifting the first operation value A leftward by 0 to m−1 bits respectively.

10. The modular multiplication method according to claim 8, wherein the main operation circuit further comprises:
an addition circuit, comprising a first carry save adder (CSA) to an m-th carry save adder, wherein the first carry save adder receives an initial sum operation value Sum(0), an initial carry operation value Carry(0), and an output value of the 0-th multiplexer, and outputs a first sum operation value Sum(1) and a first carry operation value Carry(1), the second carry save adder receives the first sum operation value Sum(1), the first carry operation value Carry(1), and an output value of the 1-th multiplexer, and outputs a second sum operation value Sum(2) and a second carry operation value Carry(2), the m-th carry save adder receives an (m−1)-th sum operation value Sum(m−1), an (m−1)-th carry operation value Carry(m−1), and an output value of the (m−1)-th multiplexer, and outputs an m-th sum operation value Sum(m) and an m-th carry operation value Carry(m) as the sum value and the carry value updated by the main operation circuit.

11. The modular multiplication method according to claim 8, wherein after the operations corresponding to the m bits of the second operation value B are completed, the updated sum value and the updated carry value outputted from the addition unit are shifted rightward by m bits then inputted to the main operation circuit, and the second operation value B is shifted rightward by m bits then m bits are stored to the 0-th register to the (m−1)-th register as another m bits of the second operation value B for the subsequent operation.

12. The modular multiplication method according to claim 8, wherein the look-up table records $2^m$ values related to the modulus, the $2^m$ values respectively are divided by $2^m$ with no remainder, the addition unit adds the updated sum value and the updated carry value after the updating step by the main operation circuit with the look-up table output value, and outputs the updated sum value and the updated carry value.

13. The modular multiplication method according to claim 8, further comprising:
when the operations corresponding to M bits of the second operation value B are completed, adding the updated sum value and the updated carry value outputted from the addition unit by a carry propagate adder to obtain a first result value; and
performing a modular operation on the first result value to obtain a second result value as an output of the modular multiplication method.

14. The modular multiplication method according to claim 8, wherein the look-up table records $2^m$ values related to the modulus, the $2^m$ values related to the modulus comprises $$0, 2^m\left(\left\lfloor \frac{P}{2^m} \right\rfloor + 1\right), 2^m\left(\left\lfloor \frac{2P}{2^m} \right\rfloor + 1\right), 2^m\left(\left\lfloor \frac{3P}{2^m} \right\rfloor + 1\right), \ldots ,$$
$$2^m\left(\left\lfloor \frac{(2^m-1)P}{2^m} \right\rfloor + 1\right),$$

wherein $\lfloor \ \rfloor$ represents a floor function.

* * * * *